(12) United States Patent
Guidotti et al.

(10) Patent No.: US 10,167,349 B2
(45) Date of Patent: Jan. 1, 2019

(54) CATALYST SYSTEM FOR THE POLYMERIZATION OF OLEFINS

(71) Applicant: Basell Poliolefine Italia S.r.l., Milan (IT)

(72) Inventors: Simona Guidotti, Ferrara (IT); Alessandro Mignogna, Ferrara (IT); Joachim T. M. Pater, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 349 days.

(21) Appl. No.: 14/365,028

(22) PCT Filed: Dec. 5, 2012

(86) PCT No.: PCT/EP2012/074394
§ 371 (c)(1),
(2) Date: Jun. 12, 2014

(87) PCT Pub. No.: WO2013/092205
PCT Pub. Date: Jun. 27, 2013

(65) Prior Publication Data
US 2015/0025211 A1    Jan. 22, 2015

Related U.S. Application Data

(60) Provisional application No. 61/578,678, filed on Dec. 21, 2011.

(30) Foreign Application Priority Data

Dec. 21, 2011 (EP) .................................. 11194817

(51) Int. Cl.
*C08F 4/16* (2006.01)
*C08F 110/06* (2006.01)
(52) U.S. Cl.
CPC ............. *C08F 4/16* (2013.01); *C08F 110/06* (2013.01)

(58) Field of Classification Search
CPC ................................. C08F 4/16; C08F 110/06
USPC .......................................... 526/213; 502/127
See application file for complete search history.

(56) References Cited

U.S. PATENT DOCUMENTS

| | | | |
|---|---|---|---|
| 3,401,157 A * | 9/1968 | Coover, Jr. ............. | C08F 10/00 502/162 |
| 6,818,583 B1 | 11/2004 | Morini et al. | |
| 7,491,670 B2 | 2/2009 | Chen et al. | |
| 7,678,868 B2 | 3/2010 | Chen et al. | |
| 8,067,510 B2 | 11/2011 | Sheard et al. | |
| 2009/0203863 A1* | 8/2009 | Chen ............................ | 526/194 |
| 2010/0168342 A1* | 7/2010 | Sheard .................... | C08F 10/06 525/249 |
| 2011/0124491 A1 | 5/2011 | Chen et al. | |
| 2011/0152067 A1 | 6/2011 | Chen et al. | |

FOREIGN PATENT DOCUMENTS

| WO | WO-2010078494 A2 | 7/2010 |
|---|---|---|
| WO | WO2012/052387 A1 | 4/2012 |

OTHER PUBLICATIONS

PCT International Search Report & Written Opinion dated Jun. 5, 2013, for PCT/EP2012/074394.

* cited by examiner

*Primary Examiner* — William K Cheung

(57) ABSTRACT

A catalyst system comprising the product obtained by contacting (a) a solid catalyst component containing Mg, Ti, halogen and at least an electron donor compound selected from phenylene aromatic diesters of a specific formula (b) an alkylaluminum cocatalyst and (c) an ester of formula R'OOC—(CR"$_2$)$_m$—COOR' in which m is an integer from 2 to 7, the R' groups, equal to or different from each other, are C$_1$-C$_{10}$ alkyl groups and the R" groups, independently, are hydrogen or C$_1$-C$_{15}$ hydrocarbon groups.

4 Claims, No Drawings

CATALYST SYSTEM FOR THE POLYMERIZATION OF OLEFINS

This application is the U.S. National Phase of PCT International Application PCT/EP2012/074394, filed Dec. 5, 2012, claiming benefit of priority to European Patent Application No. 11194817.0, filed Dec. 21, 2011, and benefit of priority under 35 U.S.C. § 119(e) of U.S. Provisional Application No. 61/578,678 filed Dec. 21, 2011, the contents of which are incorporated herein by reference in their entirety.

FIELD OF THE INVENTION

The present invention relates to a catalyst system capable to produce propylene polymers with good activity, stereospecificity and increased hydrogen response.

BACKGROUND OF THE INVENTION

Catalyst systems for the stereospecific polymerization of olefins are widely known in the art. The most common type of catalyst system belongs to the Ziegler-Natta family and comprises a solid catalyst component, constituted by a magnesium dihalide on which are supported a titanium compound and an internal electron donor compound, used in combination with an Al-alkyl compound. Conventionally however, when a higher crystallinity of the polymer is required, also an external donor, usually an alkylalkoxysilane, is needed in order to obtain higher isotacticity. This is because usually, when an external donor is absent, the isotactic index of the resulting polymer is not sufficiently high for many applications even if a 1,3-diether is used as internal donor.

In certain applications in fact, such as in thin wall injection molding (TWIM) production, it is necessary to use polymers endowed with, at the same time, relatively high fluidity i.e., with a relatively lower molecular weight, medium broad molecular weight distribution and high isotacticity in order to have high quality moldings.

Most of the catalysts belonging to the field of heterogeneous Ziegler-Natta catalysts are not able to provide high fluidity propylene polymers at standard chain transfer concentrations but are able to generate propylene polymers with medium/broad MWD and high isotacticity. An example of such catalysts is constituted by WO/2010/078494 which discloses ZN catalysts based on the use of hydrocarbyl substituted phenylene aromatic diesters as internal donors. Such catalyst components can be used together with an external donor selected from alkylalkoxysilanes, carboxylic esters and many other. Alkylalkoxysilanes are the preferred external donors. It is also suggested that $C_4$-$C_{30}$ aliphatic acid esters may be used as activity limiting agent (ALA) in combination with external donors in order to produce self-extinguishing catalyst compositions having reduced activity at temperature higher than 70° C. Esters of fatty acids like laurates, myristates, sebacates, palmitates stearate, oleates are generically mentioned but never tested.

When employing this type of Ziegler-Natta catalysts high fluidity propylene polymers could be in general obtained by greatly increasing the concentration of the chain transfer agent (molecular weight regulator) in particular hydrogen which is commonly used industrially.

This involves increasing the pressure of the reaction system which in turn would make necessary the use of equipments especially designed to withstand to higher pressure which of course would turn into an increased complexity of the plant operation. Notwithstanding the attempt, polymers having high fluidity are difficult to be obtained by this way because the insufficient hydrogen response of the catalyst prevent to reach this target at the maximum operating pressure of the plant.

Accordingly, the conventional way to obtain the desired high fluidity for propylene polymers having also high isotacticity is that of undergoing the chains of low fluidity isotactic propylene polymers to chemical visbreaking using peroxides as radical generators (rheology modifiers). From the operational point of view, however, this is not the preferred way because the stage of chemical visbreaking adds complexity to the entire process. It would therefore be highly advisable to have the said high fluidity polymers available as reactor grades. Moreover, this chemical degradation also dramatically narrows the molecular weight distribution to a level completely unsuitable for certain applications.

Ziegler-Natta catalysts based on the use of 1,3-diethers as internal donor are characterized by increased hydrogen response with respect to other catalysts. However, when they are used together with an external donor of the alkylalkoxysilane type in order to increase isotacticity the hydrogen response is worsened. Moreover, the polymers obtained also intrinsically show narrow molecular weight distribution.

It is therefore felt the need of a catalyst system showing improved hydrogen response, capability of producing, directly in polymerization, polymers with a lower molecular weight in the presence of small amounts of hydrogen and with a medium to broad molecular weight distribution.

SUMMARY OF THE INVENTION

The applicant has now found that the selection of a specific type of catalyst system is able to solve the aforementioned problem. It is therefore provided a catalyst system for olefin polymerization comprising the product obtained by contacting (a) a solid catalyst component containing Mg, Ti, halogen and at least an electron donor compound selected from phenylene aromatic diesters; (b) an organo-aluminum compound as a co-catalyst; and (c) an ester of formula R'OOC—$(CR''_2)_m$—COOR' in which m is an integer from 2 to 7, the R' groups, equal to or different from each other, are $C_1$-$C_{10}$ alkyl groups and the R" groups, independently, are hydrogen or $C_1$-$C_{15}$ hydrocarbon groups.

DETAILED DESCRIPTION OF THE INVENTION

Preferably, the solid catalyst component comprises Mg, Ti, halogen and a 1,2-phenylene aromatic diester. More preferably, the 1,2-phenylene aromatic diester is a substituted phenylene aromatic diesters of the formula (A) below:

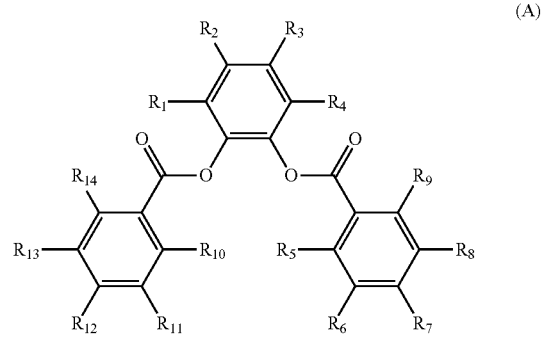

(A)

In which the groups $R_1$-$R_{14}$ equal to or different from each other, are hydrogen, halogen or $C_1$-$C_{15}$ hydrocarbon groups, optionally containing an heteroatom selected from halogen, P, S, N and Si, which may be linked to form a saturated or unsaturated mono or polycycle with the proviso that at least one of said $R_1$-$R_{14}$ groups is different from hydrogen.

More preferably, $R_1$-$R_{14}$ equal to or different from each other, are hydrogen, halogen or $C_1$-$C_{10}$ alkyl groups with the proviso that at least one is different from hydrogen. Among halogen, Cl and F are preferred.

Preferably, in the electron donor of formula (A), at least one of the $R_1$-$R_{14}$ groups different from hydrogen is selected from $R_1$-$R_4$ groups. More preferably at least one of said $R_1$-$R_4$ groups is selected from $C_1$-$C_5$ alkyl groups, such as methyl, ethyl, isopropyl, isobutyl and tert-butyl. Particularly preferably at least two of $R_1$-$R_4$ groups are selected from $C_1$-$C_5$ alkyl groups, such as methyl, ethyl, isopropyl, isobutyl and tert-butyl. Preferably, $R_1$ and $R_3$ groups are different from hydrogen and selected from $C_1$-$C_5$ alkyl groups. Still more preferably, $R_1$ is a linear $C_1$-$C_5$ alkyl group, such as methyl, and $R_3$ is a branched alkyl group such as tert-butyl.

According to an alternative embodiment, the R group different from hydrogen is selected from $R_5$-$R_{14}$ groups. Said groups different from hydrogen being selected preferably from from halogen or $C_1$-$C_{10}$ alkyl groups. It is preferred that the series $R_5$-$R_9$ and $R_{10}$-$R_{14}$ have the same substitution pattern. Preferably, $R_7$ and $R_{12}$ are different from hydrogen and are selected from halogen and $C_1$-$C_{10}$ alkyl groups.

It constitutes another preferred embodiment that in which in the electron donor of formula (A) above the substituents $R_1$, $R_3$, $R_7$ and $R_{12}$ are different from hydrogen and are selected from $C_1$-$C_{10}$ alkyl groups preferably $C_1$-$C_5$ alkyl groups while the remaining R groups are hydrogen.

One of the most preferred examples of structures (A) is: 5-(tert-butyl)-3-methyl-1,2-phenylene dibenzoate.

In addition to the phenylene aromatic diesters above described the solid catalyst component (a) can also contain additional electron donors belonging to ethers, esters of aromatic or aliphatic mono or dicarboxylic acids, ketones, or alkoxyesters.

The additional donors may be present in an amount such that the phenylene aromatic diester/additional donor molar ratio ranges from 0.1 to 10 preferably from 0.2 to 8.

As explained above, the present catalyst components comprise, in addition to the above electron donors, Ti, Mg and halogen. In particular, the catalyst components comprise a titanium compound, having at least a Ti-halogen bond and the above mentioned electron donor compounds supported on a Mg halide. The magnesium halide is preferably $MgCl_2$ in active form which is widely known from the patent literature as a support for Ziegler-Natta catalysts. Patents U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n−1, X is halogen and R is a hydrocarbon radical having from 1 to 10 carbon atoms.

The preparation of the solid catalyst component can be carried out according to several methods. According to one method, the product obtained by co-milling the magnesium chloride in an anhydrous state, the titanium compound and the electron donor compounds are treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to known techniques and then treated with an excess of $TiCl_4$ at a temperature of about 80 to 135° C. in the presence of the electron donor compounds. The treatment with $TiCl_4$ is repeated and the solid is washed with hexane in order to eliminate any non-reacted $TiCl_4$.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compounds can be added during the treatment with $TiCl_4$. They can be added together in the same treatment with $TiCl_4$ or separately in two or more treatments.

The preparation of catalyst components in spherical form are described for example in European Patent Applications EP-A-395083, EP-A-553805, EP-A-553806, EPA601525 and WO98/44001. The solid catalyst component obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10.000 Å generally ranges from 0.3 to 1.5 $cm^3/g$, preferably from 0.45 to 1 $cm^3/g$.

According to another preferred method the solid catalyst component is prepared by reacting a titanium compound of formula $Ti(OR)_{n-y}X_y$, where n, R and X have the meaning given above, with a magnesium containing precursor in the presence of the phenylene aromatic diester. The magnesium containing precursor preferably contains also Ti atoms and can be obtained by controlled precipitation through removal of alcohol from a reaction mixture comprising as essential components a magnesium alkoxide a titanium compound, an aromatic liquid, especially a chlorinated aromatic compound, most especially chlorobenzene, an alkanol, especially ethanol and a halogenating agent. Suitable halogenating agents include titanium tetrabromide, titanium tetrachloride or titanium trichloride, especially titanium tetrachloride. The alcohol removal from the mixture results in precipitation of the solid precursor, having especially desirable morphology and surface area. Moreover, the resulting precursors are particularly uniform in particle size. The removal of alcohol can be carried out in several ways. According to one preferred embodiment it is carried out via azeotropic distillation. Example of such methods are described in U.S. Pat. No. 5,077,357 and U.S. Pat. No. 6,825,146.

The solid catalyst component has an average particle size ranging from 5 to 120 μm and more preferably from 10 to 100 μm.

The organo-alkyl compound (b) is preferably an alkyl-Al compound which is preferably selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminums with alkylaluminum halides, alkylaluminum hydrides or alkylaluminum sesquichlorides such as $AlEt_2Cl$ and $Al_2Et_3Cl_3$.

The ester (c) is used as external electron donor and is preferably selected from the compounds in which R' is a $C_1$-$C_6$ linear or branched alkyl, preferably ethyl or isobutyl.

In the esters (c) m is preferably from 3 to 6 and especially from 3 to 5. The groups R", independently, are preferably selected from hydrogen or $C_1$-$C_{10}$ linear or branched alkyl groups. Still more preferably they are hydrogen.

Non limitative examples of esters (c) are diethyl succinate, diethyl glutarate, diethyl adipate, diethyl suberate, diethyl pimelate and the corresponding esters deriving from substitution of ethyl with methyl, isobutyl, 2-ethylhexyl. Diethyl pimelate and diethyl adipate are the most preferred.

The said catalyst is able to polymerize any kind of $CH_2$=CHR olefins in which R is hydrogen or a $C_1$-$C_{10}$ hydrocarbon group or mixtures of such olefins. However, as mentioned above, it is particularly suited for the preparation of propylene polymers due to the fact that it shows increased hydrogen response with respect to the most commonly used alkylalkoxysilane, while maintaining high stereospecificity expressed by a percentage of xylene insolubility at 25° C. generally of 97% or higher. The Molecular Weight Distribution (expressed as polydispersity index determined as described hereinafter) is medium or broad, generally higher than 3.5 and preferably higher than or equal to 4. Another important advantage is that hydrogen response and high stereospecificity are retained while maintaining a very good level of polymerization activity.

Any kind of polymerization process can be used with the above described catalysts. The polymerization can be carried out for example in slurry using as diluent a liquid inert hydrocarbon, or in bulk using the liquid monomer (propylene) as a reaction medium, or in solution using either monomers or inert hydrocarbons as solvent for the nascent polymer. Moreover, it is possible to carry out the polymerization process in gas-phase operating in one or more fluidized or mechanically agitated bed reactors. Also, it can be carried out in a gas-phase reactor comprising two interconnected polymerization zones one of which, working under fast fluidization conditions and the other in which the polymer flows under the action of gravity.

The described process is particularly advantageous for producing said isotactic propylene polymers with high fluidity in liquid phase because in such a type of process the pressure problems connected to the use of increased amounts of hydrogen is more evident. As mentioned, the liquid phase process can be either in slurry, solution or bulk (liquid monomer). This latter technology is the most preferred and can be carried out in various types of reactors such as continuous stirred tank reactors, loop reactors or plug-flow ones. The polymerization is generally carried out at temperature of from 20 to 120° C., preferably of from 40 to 85° C. When the polymerization is carried out in gas-phase the operating pressure is generally between 0.5 and 10 MPa, preferably between 1 and 5 MPa. In the bulk polymerization the operating pressure is generally between 1 and 6 MPa preferably between 1.5 and 4 MPa. The catalyst disclosed in the present application can be used as such in the polymerization process by introducing it directly into the reactor. In the alternative, the catalyst can be pre-polymerized before being introduced into the first polymerization reactor. The term pre-polymerized, as used in the art, means a catalyst which has been subject to a polymerization step at a low conversion degree. According to the present invention a catalyst is considered to be pre-polymerized when the amount the polymer produced is from about 0.1 up to about 1000 g per gram of solid catalyst component.

The pre-polymerization can be carried out with the α-olefins selected from the same group of olefins disclosed before. In particular, it is especially preferred pre-polymerizing ethylene or mixtures thereof with one or more α-olefins in an amount up to 20% by mole. Preferably, the conversion of the pre-polymerized catalyst component is from about 0.2 g up to about 500 g per gram of solid catalyst component.

The pre-polymerization step can be carried out at temperatures from 0 to 80° C. preferably from 5 to 50° C. in liquid or gas-phase. The pre-polymerization step can be performed in-line as a part of a continuous polymerization process or separately in a batch process. When batch pre-polymerization is performed, it is preferred to prepolymerize the catalyst of the invention with ethylene in order to produce an amount of polymer ranging from 0.5 to 20 g per gram of catalyst component.

As explained, the catalyst system is particularly suitable for the preparation of high fluidity polymers, such as polymers having a melt flow rate of higher than 50, preferably higher than 100 and more preferably higher than 250 g/10'. Such high fluidity polymers, also characterized by narrow molecular weight distribution are particularly suitable for fibers preparation.

The following examples are given in order to better illustrate the invention without limiting it.

EXAMPLES

Characterizations

Determination of X.I.

2.5 g of polymer and 250 ml of o-xylene were placed in a round-bottomed flask provided with a cooler and a reflux condenser and kept under nitrogen. The obtained mixture was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I. %.

Melt Flow Rate (MFR)

Determined according to ISO 1133 (230° C., 2.16 Kg)

Polydispersity Index (P.I.)

Determined at a temperature of 200° C. by using a parallel plates rheometer model RMS-800 marketed by RHEOMETRICS (USA), operating at an oscillation frequency which increases from 0.1 rad/sec to 100 rad/sec. The value of the polydispersity index is derived from the crossover modulus by way of the equation:

$$P.I.=10^5/Gc$$

in which Gc is the crossover modulus defined as the value (expressed in Pa) at which G'=G" wherein G is the storage modulus and G" is the loss modulus.

General Procedure for Preparation of the Catalyst Precursor

In a jacketed glass reactor of 1 liter, mounted with mechanical agitator and baffles, 370 ml of chlorobenzene is charged at room temperature, followed by 41 g of Mg(OEt)$_2$, 18.3 ml of Ti(OEt)$_4$, 4.6 ml of o-cresol and 34 ml of ethanol. Then, a solution of 5.4 ml TiCl$_4$ in 90 ml chlorobenzene is dripped into the reactor. The temperature is brought to 65° C., and agitation is continued for 2 hours, until all solids have dissolved. Then, the temperature is increased to 100° C. and the azeotropic mixture of ethanol and chlorobenzene is distilled off.

Then, agitation is stopped, and the solid is allowed to settle, keeping the temperature at 95° C. The liquid is siphoned off, and the remaining solid is washed with chlorobenzene at 50° C., and then three times with hexane.

The obtained solid has an average particle size of 48 micron, it contains 7.6% wt of titanium and 13.2% wt of magnesium.

General Procedure A for the Preparation of the Solid Catalyst Component

Into a 500 ml round bottom flask, equipped with mechanical stirrer, cooler and thermometer 250 ml of a 1:1 volume ratio mixture of TiCl$_4$ and chlorobenzene were introduced at room temperature under nitrogen atmosphere. After cooling to 0° C., while stirring, the internal donor 5-(tert-butyl)-3-methyl-1,2-phenylene dibenzoate and 10.0 g of the above described catalyst precursor were sequentially added into the flask. The amount of internal donor was such to have a Mg/donor molar ratio of 6.7.

The temperature was raised to 100° C. and maintained for 1 hours. Thereafter, stirring was stopped, the solid product was allowed to settle and the supernatant liquid was siphoned off maintaining the temperature at 100° C. After the supernatant was removed, additional fresh chlorobenzene/TiCl$_4$ mixture was added to reach the initial liquid volume again. The mixture was heated to 130° C. and kept at this temperature for 0.5 hour. Stirring was stopped again, the solid was allowed to settle and the supernatant liquid was siphoned off. The titanation step was repeated 1 more time with the same mixture at 130° C. for 0.5 hour.

After siphoning off the liquid phase of the third titanation, the solid was washed with anhydrous hexane six times (6×100 ml) in temperature gradient down to 60° C. and one time (100 ml) at room temperature. The obtained solid was then dried under vacuum, analyzed and used in the polymerization of propylene. The solid contains 3.5% wt of Ti.

Examples 1-3 and Comparative Examples C1 and C2

A 4-liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, were charged in sequence with 75 ml of anhydrous hexane, 0.76 g of AlEt$_3$, the external donor (c) reported in Table 1 (AlEt$_3$/ED molar ratio of 20) and 10 mg of solid catalyst component prepared as described here above. The autoclave was closed; subsequently the amount of hydrogen reported in Table 1 was added. Then, under stirring, 1.2 kg of liquid propylene was fed. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed, analyzed and fractionated with o-xylene to determine the amount of the xylene insoluble (X.I.) fraction. Polymer analyses, as well as catalyst activity, are reported in Table 1.

TABLE 1

| Ex. | ED | H$_2$ (NL) | Mileage (kg/g) | XI (%) | MIL g/10' | PI |
|---|---|---|---|---|---|---|
| 1 | DEA | 10 | 66 | 98.1 | 40 | 4.6 |
| 2 | DEP | 10 | 75 | 98.3 | 52 | 4.6 |
| 3 | DES | 10 | 61 | 98.5 | 49 | n.d. |
| C1 | C | 10 | 104 | 98.6 | 11 | n.d. |
| C2 | D | 10 | 90 | 98.9 | 7 | n.d. |

DEA = Diethyl Adipate
DEP = Diethyl Pimelate
DES = Diethyl Suberate
C = Cyclohexylmethyldimethoxy silane
D = Dicyclohexyldimethoxysilane
n.d. = no data

What is claimed is:

1. A catalyst system for olefin polymerization comprising the product obtained by contacting:
   (a) a solid catalyst component comprising Mg, Ti, a halogen and a 1,2-phenylene aromatic diester;
   (b) triethylaluminum; and
   (c) an additional ester selected from the group consisting of diethyl pimelate and diethyl suberate;
   wherein the molar ratio of 1,2-phenylene aromatic diester to additional ester is 0.1-10.

2. A process for the (co)polymerization of olefins comprising polymerizing an olefin in the presence of hydrogen and a catalyst system according to claim 1.

3. The catalyst system of claim 1, wherein the molar ratio of 1,2-phenylene aromatic diester to additional ester is 0.2-8.

4. The catalyst system of claim 1, wherein the 1,2-phenylene aromatic diester is 5-(tert-butyl)-3-methyl-1,2-phenylene dibenzoate.

* * * * *

UNITED STATES PATENT AND TRADEMARK OFFICE
CERTIFICATE OF CORRECTION

| | | |
|---|---|---|
| PATENT NO. | : 10,167,349 B2 | |
| APPLICATION NO. | : 14/365028 | |
| DATED | : January 1, 2019 | |
| INVENTOR(S) | : Guidotti et al. | |

It is certified that error appears in the above-identified patent and that said Letters Patent is hereby corrected as shown below:

In the Specification

In Column 1, Line 50, delete "other." and insert -- others. --, therefor
In Column 2, Line 3, delete "prevent" and insert -- prevents --, therefor
In Column 2, Line 18, delete "donor" and insert -- donors --, therefor
In Column 3, Line 26, after "preferably from" delete "from"

Signed and Sealed this
Nineteenth Day of September, 2023

Katherine Kelly Vidal
*Director of the United States Patent and Trademark Office*